Oct. 14, 1969  R. S. TRACHTENBERG  3,472,945
DIVIDED OUTLET BOX
Filed Jan. 25, 1968

INVENTOR.
ROBERT S. TRACHTENBERG
BY
Thomas S. Mayner
ATTORNEY

United States Patent Office 3,472,945
Patented Oct. 14, 1969

3,472,945
DIVIDED OUTLET BOX
Robert S. Trachtenberg, Pittsburgh, Pa., assignor to Midland-Ross Corporation, Cleveland, Ohio, a corporation of Ohio
Filed Jan. 25, 1968, Ser. No. 700,499
Int. Cl. H01r *13/46;* H01h *9/02, 13/04*
U.S. Cl. 174—53                                8 Claims

ABSTRACT OF THE DISCLOSURE

A standard electrical outlet box is provided with a conforming partition of predetermined maximum height, subject to later reduction to fit the height of the box, with downwardly extending tapered conical nipples for base insertion and triangularly shaped base side supports. The box is particularly adapted for an acceptance of a multiplicity of wiring systems.

---

This invention relates to electrical outlet boxes and, more particularly, to a partition adapted to subdivide a box to enable it to accept separate wiring systems such as for different power or a combination of power and communication.

With the rapid development of various kinds of electrical appliances, portable phones, improved lighting systems, and general increased use of electric power, there is a need, in fact a demand, for a plurality of outlets but at the same time for economy and contraction of wiring systems. To this end single conduits have been devised to carry different power lines to an outlet box. However, outlet boxes have been standardized for over an extended period by building codes so whatever improvements are provided they generally are within the limits of the aforesaid regulations. Then to enable the use of standard equipment yet provide for more circuits, this invention advantageously provides for a stabilized partition for outlet box, dividing it into areas accepting different wiring systems. The partition is flexible in that over a certain range various weights or sizes of wiring can be utilized, for instance, either copper or aluminum wiring, or both.

Also, with the advent of the larger sized aluminum wiring, more room is needed in a standard outlet box and this can be produced by increasing the box depth by using a deeper cover plate. The partition can be made incrementally smaller to fit a correspondingly shallower cover plate. The partition may be of metal or a dielectric insulating material, and initially of fixed maximum depth, designed to separate wiring of various sizes. Depending on depth of box, the divider can be readily reduced in height, even to a standard size.

Figure 1:
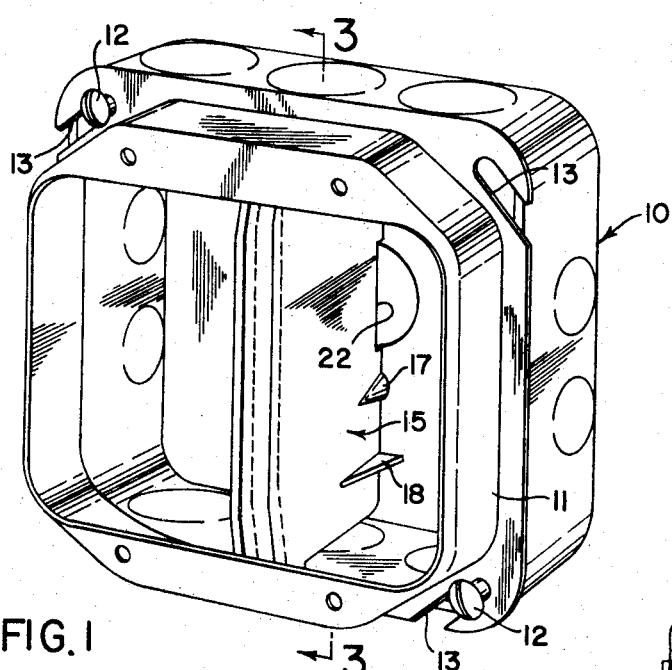
Figure 2:
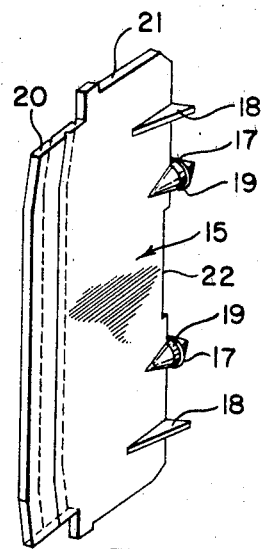
Figure 3:
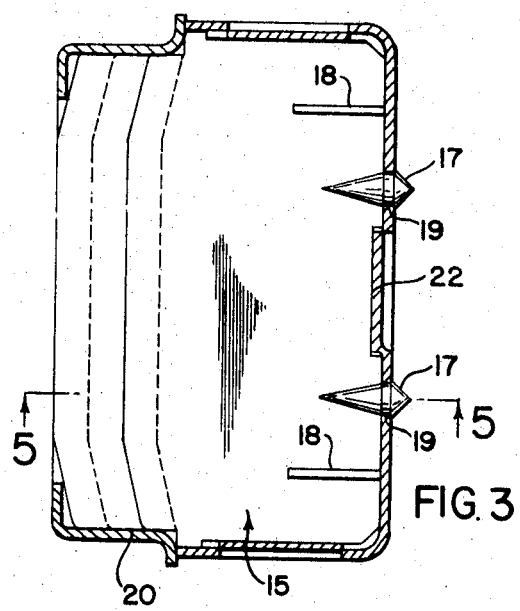
Figure 4:
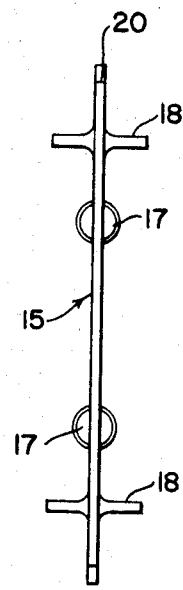
Figure 5:
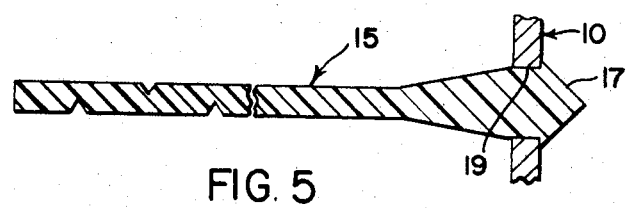
Figure 6:
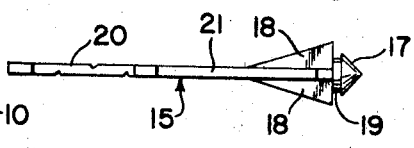

The divided outlet box of this invention will now be described in detail in the following specification and drawing, where:

FIGURE 1 is a perspective view of the box with the dividing partition in position;
FIGURE 2 is a perspective view of the partition itself;
FIGURE 3 is a cross section of FIGURE 1 taken across line 3—3;
FIGURE 4 is a plan view of the partition; and
FIGURES 5 and 6 are additional sectional views of the partition showing its support structure.

In the embodiment shown in FIGURE 1, a standard square or rectangular outlet box 10 is built up by means of an extender face or cover 11 secured to the box itself by means of screws 12 positioned in corner slots 13 and threaded into corner lugs of the box 10 itself (not shown). The depth increasing extender section or cover 11 is useful in that it also provides room for wall finishing over the recessed box and, at the same time, more box space for wiring. The depth or space in the box 10, however, is adjustable and the cover 11, of whatever necessary height, the partition 15 can be equally adjusted as a space divider. If the box 10 is square then the partition 15 can be positioned in either direction, as shown in the drawing or at 90° thereto. At the time of manufacture the box 10 is stamped out with the corner lugs and predetermined sufficient knockout openings in its base and sides as well as openings for mounting screws. Simultaneously, openings are also formed being adapted to accept conically tapered stabilizing base extensions 17 of the partition 15.

In FIGURES 2, 3 and 4, the partition 15 is shown as being essentially a flat section except for its base. It is generally rectangular in shape conforming to the interior of the box fitting snugly therein. To secure it against displacement, as against rotating movement or lateral movement in the box, the partition is provided with further base structures adapted to extend into the base punched holes of the box to rest securely against the box inner base surface. These additional base support improvements are the reverse taper cone-shaped nipple extensions or additions 17 adapted to protrude through and to snugly fit into holes in the box base; and the triangularly shaped lateral or cross 90° adjuncts or extensions 18. The conical insertion members 17 are further made reversely conical so that upon insertion and firming of position as by hammer tapping the member is forced into the opening beyond the greatest diameter, thus locking or buttoning the partition to the box base. The 90° lateral base extensions 18 further advantageously prevent a rocking or rotating lateral movement of the top of the partition 15 preventing a "rocking" which could result in the displacement of the conical nipple adjuncts 17. As indicated generally, the greatest diameter of the reversely conical nipple members 17 are made slightly larger than the diameter of the acceptance holes.

The material of which the partition is made is generally rigid of hard synthetic material but it also can be of some such materials as in zinc die castings and other metals, preferably somewhat softer than that of the metal box, in order that the nipples can contract somewhat when forced through the holes in the base of the box. The use of a synthetic material prevents shorting between systems of different voltages. When the partition is placed into position it is generally tapped by a hammer to force the cone or nipple extensions into the box openings wherein they become firmly embedded. The conical extension 17 also can be slightly undercut as at 19 in FIGURES 6 and 7 beyond its greatest diameter for a width about equal to the thickness of the box 10 wall to allow for locking. When it is forced through an opening to secure it in a box, the fore part of the cone wall extends beyond the box wall and locks the partition in place somewhat urging the partition base against the box base. Because the partition material is more resilient than the box metal it will flow or expand outwardly after compression to provide the aforesaid locking.

Again, as shown and thus far described the partition 15 is made for a box 10 having an extender top section 11. These extender sections or covers 11 can be of various depths so the partition must be adjustable thereto. To this extent the partition is formed as indicated in the drawing, particularly as in FIGURE 5. The upper side-recessed portion 20 (FIGURE 2) is initially formed to a maximum accepted or a desired height in this example of about one inch above a standard box depth and incrementally creased in ¼ inch depths. In the present showing there are three height sections of ¼ inch starting above the initial ¼ inch. As shown, the extension increment is above ¼ inch. The height denoting increments are deep creases in the material so that they can be snapped off by means of pliers to a depth required by the existing or desired conditions. This is particularly true where the partition is made of a phenolic material which is fairly brittle. A clean sectional separation is readily achieved. Further, if desired the partitions can be made of such depth so that any cover placed over the box will be drawn down onto the top of it to additionally secure the wiring separating partition against displacement. It has been found, however, that this additional partition height is not needed except where the wiring is excessively bunched then subsequently disturbed. Also, where knockouts are encountered in a box, the partition can be indentured at the sides, as at 21 and in the base as at 22 (FIGURE 2), to accommodate them.

While the divider partition 15 is shown with conical protrusions 17 since that is the preferred way of its being molded when struck out of a flat metal the protrusions are flat. The flat extension is also tapered away from the partition base and it can be indent cut prior to its mergence with the partition base to provide a similar lock with the box when forced through the box base opening.

What is claimed is:

1. In an electric outlet box having knockouts and openings in its base, a partition positioned therein to separate different incoming wiring systems, said partition comprising, a space divider having indents in its sides and base to accommodate said knockouts being positionable in said outlet box, and said space divider having base supporting tapered protrusions for insertion into the box base openings for locking said divider in position, said protrusions being forced through said base openings.

2. The combination of claim 1 where the space divider is made of material having resiliency for insertion through said base openings of the box in which it is positioned.

3. The combination of claim 2 where the divider protrusions are downwardly tapered and have equal peripheral indents at about their mergence with the divider base the protrusions being forced into the box base openings and into the side cuts.

4. The combination of claim 1 where the divider base protrusions are conical and tapered away from the divider base and are circumferentially grooved at about the mergence with the divider base.

5. The combination of claim 1 where the base of said divider is further provided with laterally extending side supports adapted to rest on the box base.

6. The combination of claim 1 where divider height is incrementally sectionally creased permitting height adjustment by increment breaking of its top sections.

7. The combination of claim 1 where the divider protrusions are reversely conical, the base free section of a protrusion including the greatest diameter adapted to be thrust through the box base opening.

8. The combination of claim 1 where the divider protrusions are reversely conical and are circumferentially grooved beyond their greatest diameter, the groove being about equal in width to the thickness of the box base.

References Cited

UNITED STATES PATENTS 1,920,811   8/1933   Schwabacher _____ 174—52

FOREIGN PATENTS 775,739   5/1957   Great Britain.

LEWIS H. MYERS, Primary Examiner

D. A. TONE, Assistant Examiner

U.S. Cl. X.R.

220—22